3,702,868
PROCESS FOR THE PREPARATION OF ACETIC ACID BY CATALYTIC OXIDATION OF OLEFINES IN GASEOUS PHASE
Nicola Santangelo, Milan, Giancarlo Battiston, Baranzate, Gianfranco Pregaglia, Milan, Enrico Cavaterra, Saronno, and Mauro Croci, deceased, late of Novara, Italy, by Angelo Croci and Margherita Biagioni, heirs, Novara, Italy; said Santangelo, Battiston, Pregaglia, and Cavaterra, assignors to Montecatini Edison S.p.A., Milan, Italy
No Drawing. Filed Sept. 28, 1970, Ser. No. 76,326
Claims priority, application Italy, Oct. 31, 1969, 62,046/69; Feb. 3, 1970, 20,155/70
Int. Cl. C07c 51/32
U.S. Cl. 260—533 R                     18 Claims

ABSTRACT OF THE DISCLOSURE

A process is disclosed for the prepartion of acetic acid by the oxidation with oxygen or with an oxygen-containing gas, of one or more low molecular weight unsaturated hydrocarbons containing more than 2 carbon atoms, wherein the reaction is conducted with a quantity of unsaturated hydrocarbon between 1.5% and 10% by volume with respect to the reaction mixture; with a molar ratio oxygen/unsaturated hydrocarbon between 1:1 and 5:1; at a temperature of from 250° to 500° C.; with a contact time between 0.1 and 20 seconds; and in the presence of a catalyst consisting or consisting essentially of: molybdenum, vanadium, oxygen and, optionally, antimony, activated by heating at a temperature between 400° and 650° C. and in which the atomic ratios between the elements Mo, V and Sb correspond to the empirical formula: $Mo_a V_b Sb_c$ wherein $a+b+c=100$, $a$ varies from 5 to 95, $b$ varies from 5 to 95 and $c$ varies from 0 to 90.

---

The present invention relates to a process for the preparation of acetic acid by the catalytic oxidation in vapor phase, with molecular oxygen or gases containing oxygen, of unsaturated hydrocarbons having a low molecular weight and containing more than 2 carbon atoms.

Acetic acid is generally produced by the carbonylation of methanol or by the oxidation of acetaldehyde, butane and higher hydrocarbons.

Moreover, it is known that it is possible to catalytically oxidize in a gaseous phase lower olefines into acetic acid. However, in this case it is not possible, generally, to obtain satisfactory results, inasmuch as high percentages of the converted hydrocarbons are lost in the form of carbon oxides.

It has now surprisingly been found that using the catalysts according to the process which is the object of this invention, it is possible to oxidize lower unsaturated hydrocarbons in a highly selective way into acetic acid, while maintaining the combustion within very restricted limits.

The present invention thus relates to a process for the preparation of acetic acid by oxidation with oxygen or oxygen-containing gases, of one or more lower unsaturated hydrocarbons containing more than 2 carbon atoms, characterized in that the reaction is carried out|in the presence of a catalyst containing molybdenum, vanadium, oxygen and, optionally, antimony, with a quantity of hydrocarbons between 1.5% and 10% by volume with respect to the reaction mixture, with a molar ratio oxygen/unsaturated hydrocarbon between 1:1 and 5:1 and at temperatures of from 250° to 500° C.

The contact time, defined as a ratio of the apparent volume of the catalyst to the volume of gas fed per time unit under the reaction conditions, is comprised between 0.1 and 20 seconds.

As starting compounds according to this invention, propylene, butene, isobutene as well as mixtures of these hydrocarbons, including various mixtures comprising them and obtained as by-products of the chemical and petrochemical industry, may be used with particularly advantageous results.

The catalysts used in this process contain mixtures of oxides of molybdenum, vanadium and, optionally, antimony or, more generally, compounds of molybdenum, vanadium, oxygen and, optionally, antimony, such that the atomic ratios among the molybdenum, vanadium and antimony elements are indicated by the following empirical formula:

$$Mo_a V_b Sb_c$$

wherein: $a+b+c=100$; $a$ varies from 5 to 95; $b$ varies from 5 to 95; and $c$ varies from 0 to 90.

It has been observed that the presence of antimony in the catalytic composition, in general, brings about a considerable reduction in the formation of carbon oxides and enables one to control the reaction more easily.

For the preparation of the catalyst various methods, already known per se in the prior art, may be used for achieving such mixtures of oxides of molybdenum, vanadium and, optionally, antimony or, more generally, such molybdenum, vanadium, oxygen and, optionally, antimony compounds so that the atomic ratios Mo/V/Sb will be precisely as indicated above.

For instance, in the case of catalysts containing only molybdenum, vanadium and oxygen, one may mix together while heating concentrated aqueous solutions of ammonium paramolybdate and metavanadate in suitable ratios. The solution thus obtained is then slowly brought to dryness under constant stirring. On the other hand, in the case of catalysts containing molybdenum, vanadium, antimony and oxygen one may mix together while heating concentrated aqueous solutions containing ammonium paramolybdate and metavanadate in suitable ratios to which is then admixed an aqueous solution of $SbCl_3$, acidified by HCl. The solution thus obtained is then neutralized with ammonia and then, while vigorously stirring, it is slowly dried.

In any case, the dry residue once obtained is treated at a temperature of 110° C. and finally calcined in an air or nitrogen stream, at temperatures between 400° and 650° C., but preferably between 450° and 600° C., and for a period of time ranging from 4 to 20 hours.

The catalyst may be used either without a carrier or with a suitable carrier such as, for instance, silica, alumina, silica-alumina, silicon carbide, pumice, etc.

The process may be carried out in any type of reactor suitable for carrying out the oxidation in gaseous phase. Thus, there may be used fixed bed reactors as well as fluid bed reactors.

The reaction may be conducted at normal pressure or under superatmospheric pressure (for instance up to 15 atm.) in order to increase the yield of acetic acid.

The preferred reaction temperature is between 300° and 450° C.

The contact time, defined as already explained, is preferably between 0.5 and 10 seconds.

The quantity of starting unsaturated hydrocarbon or hydrocarbons is preferably between 2.5 and 6% by volume with respect to the reaction mixture.

The oxygen necessary for the oxidation of the unsaturated hydrocarbons, according to this invention, may be introduced in the form of 100% pure oxygen, but if there are no particular reasons for concentration, then air is the preferred agent as well as the cheapest.

The molar ratio between oxygen and the olefine is preferably between 1.5:1 and 3.5:1.

The oxidation is preferably conducted in the presence of one or more diluents such as nitrogen, steam, carbon dioxide, saturated hydrocarbons, etc.

The process of the present invention is particularly advantageous since it permits one to use directly, in order to obtain such a very desirable industrial product as acetic acid, fractions of unsaturated hydrocarbons with 4 carbon atoms obtained both from refinery cracking as well as from steam-cracking, the availability of which as a raw material, as is well known, is quite considerable in the petrochemical industry.

The following examples are given in order still better to ilustrate the inventive concept of the present invention. The terms: "conversion" and "selectivity," as used herein, means respectively:

Conversion of the olefine in percent $$=\frac{\text{moles of fed olefine} - \text{moles of unreacted olefine}}{\text{moles of fed olefine}} \times 100$$

Selectivity of the product in percent $$=\frac{\text{g. of carbon atoms in the product}}{\text{g. of carbon atoms in the reacted olefine}} \times 100$$

In all of the reported examples the catalysts were employed in fixed bed reactors and the reaction products were determined by direct gas-chromatographic analysis, except for maleic acid which was determined by potentiometric titration on the condensed fraction.

The reaction products obtained by the process according to the present invention may comprise, besides acetic acid, butadiene, formaldehyde, acetic-, propionic-, acrylic- and methacrylic-aldehyde, acetone and methylethylketone, propionic-, acrylic-, methacrylic- and maleic acids.

In the following examples, compounds produced with a selectivity lower than 1% have not been reported.

EXAMPLE I

To an aqueous solution containing 280 g. of ammonium paramolybdate $(NH_4)_6Mo_7O_{24} \cdot 4H_2O$ were added 37.2 g. of ammonium metavanadate $(NH_4VO_3)$ and the solution was then heated up to complete dissolution.

The solution was then evaporated to dryness and the residue, after drying at 110° C. in an oven, was calcined at 450° C. for 10 hours in an air stream.

Onto the catalyst was then fed a gaseous mixture consisting by volume of 4% of 2-butene, 52% of air and 44% of steam. The reaction temperature was 370° C., the pressure was 1.2 atm. and the contact time was 2 seconds.

The results obtained were as follows:

| | Percent |
|---|---|
| Butene conversion | 96.3 |
| Acetic acid selectivity | 46.7 |
| Acetaldehyde selectivity | 4.1 |
| Maleic acid selectivity | 8.8 |
| Acrylic acid selectivity | 4.3 |
| $CO + CO_2$ selectivity | 35.3 |

Over the same catalyst was passed a gaseous mixture consisting by volume of 5% of 1-butene, 55% of air and 40% of steam. Operating at 400° C., under a pressure of 1.2 atm. and with a contact time of 2 seconds, the following results were obtained:

| | Percent |
|---|---|
| Butene conversion | 85.4 |
| Acetic acid selectivity | 46.2 |
| Acetaldehyde selectivity | 7.6 |
| Acrylic acid selectivity | 5.9 |
| Butadiene selectivity | 3.1 |
| $CO + CO_2$ selectivity | 27.4 |

EXAMPLE II

In a vessel fitted with a stirrer and containing an aqueous solution containing 123.6 g. of ammonium paramolybdate was admixed another solution containing 254.6 g. of $V_2O_5$, acidified by HCl. Thereupon, and while maintaining the solution neutral by the addition of ammonia at 10%, the whole was slowly brought to dryness. The residue was then dried at 110° C. in an oven and finally activated at 500° C. in an air stream for 8 hours.

Overthe catalyst thus prepared was then passed a gaseous mixture containing by volume 4% of 2-butene, 52% of air and 44% of steam, at 370° C. and under a pressure of 1.2 atm. and with a contact time of 2 seconds. In this way the following results were obtained:

| | Percent |
|---|---|
| Butene conversion | 91.0 |
| Acetic acid selectivity | 44.0 |
| Acetaldehyde selectivity | 6.5 |
| Acrylic acid selectivity | 7.2 |
| Maleic acid selectivity | 4.3 |
| $CO + CO_2$ selectivity | 36.5 |

EXAMPLE III 353 g. of ammonium paramolybdate were dissolved in 800 cc. of water. To this solution were then added 46.8 g. of ammonium metavanadate and the whole was then heated up until a clear solution was obtained. This solution was then treated with 598 g. of microspheroidal silica as carrier.

The product thus obtained was dried in an oven at 110° C. and then activated in an air current at 450° C. for 8 hours.

The carrier formed 65% by weight of the whole catalyst.

Upon passing over this catalyst a gaseous mixture consisting by volume of 4.35% of 2-butene, 15.15% of $O_2$, 36% of nitrogen and 44.5% of steam, at a temperature of 350° C. and under a pressure of 1.2 atm. and with a contact time of 1.8 seconds, the following results were obtained:

| | Percent |
|---|---|
| Butene conversion | 93.0 |
| Acetic acid selectivity | 54.2 |
| Maleic acid selectivity | 6.1 |
| Acrylic acid selectivity | 5.8 |
| Acetaldehyde selectivity | 2.4 |
| $CO + CO_2$ selectivity | 27.0 |

EXAMPLE IV

To an aqueous solution containing 106 g. of ammonium paramolybdate and 70 g. of ammonium metavanadate were admixed 468 g. of a silica sol at 30%. This mixture was then brought to dryness and the product thus obtained was then dried in an oven at 110° C. and activated for 8 hours in an air current at 450° C.

Here the feed mixture consisted by volume of 4.35% of 2-butene, 15.15% of $O_2$, 36% of nitrogen and 44.5% of steam, catalyzed at 320° C. and under a pressure of 1.2 atm. and for a contact time of 1.8 seconds. The following results were obtained:

| | Percent |
|---|---|
| Butene conversion | 100.0 |
| Acetic acid selectivity | 52.4 |
| Maleic acid selectivity | 7.1 |
| $CO + CO_2$ selectivity | 37.2 |

EXAMPLE V

To an aqueous solution containing 280 g. of ammonium paramolybdate were added 37.2 g. of ammonium metavanadate and the whole mixture was then heated up to complete dissolution.

The solution was then evaporated to dryness and the product obtained was activated in an air current at 450° C. for 8 hours.

Over the catalyst thus prepared was passed a gaseous mixture containing by volume 5% of isobutene, 55% of air and 40% of steam. At a temperature of 430° C. and under a pressure of 1.2 atm. and with a contact time of 1.5 seconds, the following results were obtained:

| | Percent |
|---|---|
| Isobutene conversion | 72.8 |
| Acetic acid selectivity | 29.3 |
| Methacrolein selectivity | 20.5 |
| Methacrylic acid selectivity | 3.3 |
| Acetone selectivity | 8.6 |
| $CO+CO_2$ selectivity | 38.2 |

Over the same catalyst was passed a gaseous mixture consisting by volume of 4% of propylene, 36% of air, 20% of nitrogen and 40% of steam, at a temperature of 330° C. Operating at a pressure of 2.5 atm. and with a contact time of 2 seconds, the following results were obtained:

| | Percent |
|---|---|
| Propylene conversion | 79.0 |
| Acetic acid selectivity | 53.7 |
| Acrylic acid selectivity | 4.0 |
| Acrolein selectivity | 6.3 |
| $CO+CO_2$ selectivity | 36.0 |

EXAMPLE VI

To an aqueous solution containing 300 g. of ammonium paramolybdate and 11 g. of ammonium metavanadate was admixed an aqueous solution, acidified by HCl, containing 21.5 g. of $SbCl_3$. This solution, neutralized with ammonia at 10%, was brought to dryness and the residue, after drying in an oven, was calcined in an air stream at 450° C. for 8 hours.

The catalyst thus obtained was tested with a feed mixture consisting by volume of 4% of 2-butene, 52% of air and 44% of steam, at a temperature of 400° C. and under a pressure of 1.2 atm. and with a contact time of 2 seconds. The results obtained by operating in this way were as follows:

| | Percent |
|---|---|
| Butene conversion | 97.0 |
| Acetic acid selectivity | 37.4 |
| Acetaldehyde selectivity | 6.4 |
| Methacrolein selectivity | 7.2 |
| Acrolein selectivity | 1.5 |
| Acrylic acid selectivity | 7.8 |
| Methacrylic acid selectivity | 1.7 |
| Maleic acid selectivity | 9.4 |
| $CO_2+CO$ selectivity | 27.5 |

EXAMPLE VII 300 g. of ammonium paramolybdate were dissolved in hot water. To this solution were then admixed 39.7 g. of ammonium metavanadate and the whole was then heated up to complete dissolution.

Separately there was prepared another aqueous solution, acidified with HCl, and containing 38.8 g. of $SbCl_3$. The two solutions were then mixed together, neutralized with ammonia at 10% and then slowly brought to dryness. The residue, after drying in a oven at 110° C., was then activated for 7 hours in a nitrogen stream at 450° C.

Into the reactor containing the catalyst prepared as just described a gaseous mixture was introduced consisting by volume of 4.1% of 2-butene, 51.9% of air and 44% of steam. The reaction temperature was 400° C., the pressure was 1.2 atm. and the contact time was 1 second. In this way the following results were obtained:

| | Percent |
|---|---|
| Butene conversion | 91.2 |
| Acetic acid selectivity | 54.4 |
| Acrylic acid selectivity | 10.7 |
| Maleic acid selectivity | 5.0 |
| Methacrolein selectivity | 4.4 |
| $CO+CO_2$ selectivity | 22.5 |

EXAMPLE VIII

To an aqueous solution containing 150 g. of ammonium paramolybdate were admixed 99.4 of ammonium metavanadate and the mixture was then heated up to complete dissolution. Separately there was then prepared an aqueous solution, acidified with HCl and containing 19.4 g. of $SbCl_3$. These two solutions were then mixed together, neutralized with diluted ammonia, and then slowly brought to dryness with constant stirring.

The residue, dried in an oven at 110° C., was then calcined at 550° C. for 8 hours in a stream of air.

Over the catalyst thus obtained was passed a gaseous mixture containing by volume 4.3% of 2-butene, 15% of oxygen, 33.4% of nitrogen and 47.3% of steam, at a temperature of 370° C. and under a pressure of 1.2 atm. and with a contact time of 3 seconds, thereby obtaining the following results:

| | Percent |
|---|---|
| Butene conversion | 91.6 |
| Acetic acid selectivity | 44.2 |
| Acetaldehyde selectivity | 12.6 |
| Methacrolein selectivity | 7.3 |
| Acrylic acid selectivity | 4.0 |
| Maleic acid selectivity | 5.7 |
| $CO+CO_2$ selectivity | 23.7 |

EXAMPLE IX

To an aqueous solution containing 45 g. of ammonium paramolybdate and 119 g. of ammonium metavanadate was admixed an aqueous solution, acidified by HCl, containing 29 g. of $SbCl_3$. After neutralization with ammonia at 10%, this solution was then brought to complete dryness and the residue, after having been dried at 110° C. was calcined at 550° C., in an air stream for 8 hours.

Over the catalyst thus obtained was then passed a gaseous mixture consisting by volume of 5% of 2-butene, 55% of air and 40% of steam.

The reaction temperature was maintained at 330° C., while the pressure was 1.2 atm. and the contact time was 4 seconds.

The results obtained were as follows:

| | Percent |
|---|---|
| Butene conversion | 90.0 |
| Acetic acid selectivity | 54.2 |
| Acetaldehyde selectivity | 11.3 |
| Acrylic acid selectivity | 3.5 |
| Maleic acid selectivity | 2.3 |
| $CO+CO_2$ selectivity | 26.9 |

EXAMPLE X

To an aqueous solution, acidified with HCl and containing 5.4 g. of $V_2O_5$ and 232 g. of $SbCl_3$, was admixed an aqueous solution containing 10 g. of ammonium paramolybdate. After neutralizing with ammonia, the solution was brought to dryness and the residue was then dried in an oven at 110° C. and finally calcined for 8 hours at 450° C. in an air stream.

Over the catalyst thus prepared was passed a gaseous mixture consisting by volume of 4.3% of 2-butene, 52% of air and 43.7% of steam. Operating at 370° C. under a pressure of 1.2 atm. and with a contact time of 2 seconds, the following results were achieved:

| | Percent |
|---|---|
| Butene conversion | 89.0 |
| Acetic acid selectivity | 36.8 |
| Acetaldehyde selectivity | 7.4 |
| Acrolein selectivity | 2.8 |
| Methacrolein selectivity | 6.8 |
| Acrylic acid selectivity | 7.3 |
| Methacrylic acid selectivity | 3.1 |
| Maleic acid selectivity | 10.6 |
| $CO_2+CO$ selectivity | 24.1 |

EXAMPLE XI

An aqueous solution, acidified with HCl and neutralized with ammonia, containing 30 g. of ammonium paramolybdate, 29.9 g. of ammonium metavanadate and 290.4 g. of $SbCl_3$, was brought to dryness. The residue, after drying at 110° C., was then activated at 500° C. in an air stream for 8 hours.

The catalyst thus prepared was tested by passing over it a feed mixture containing by volume 3.5% of 2-butene, 11.2% of $O_2$, 32.8% of nitrogen and 52.5% of steam, operating at 355° C. under a pressure of 1.2 atm. and with a contact time of 3 seconds. The following results were obtained:

|  | Percent |
|---|---|
| Butene conversion | 98.6 |
| Acetic acid selectivity | 50.0 |
| Acetaldehyde selectivity | 3.2 |
| Acrylic acid selectivity | 6.5 |
| Maleic acid selectivity | 8.6 |
| $CO_2$+CO selectivity | 30.0 |

EXAMPLE XII

To an aqueous solution containing 45 g. of ammonium paramolybdate were admixed 119 g. of ammonium metavanadate and the whole was then heated up to complete dissolution. Separately, there was prepared an aqueous solution, acidified with HCl, containing 290.4 g. of $SbCl_3$. These two solutions were mixed together, neutralized with ammonia at 10% and then slowly brought to dryness with constant stirring. The residue, after drying in an oven at 110° C., was then calcined at 550° C. for 8 hours in a stream of air.

In this way there was obtained a catalyst which was tested with a feed mixture consisting by volume of 3.7% of 2-butene, 13% of oxygen, 39.9% of nitrogen and 44.4% of steam. The catalysis was carried out at a temperature of 320° C. under a pressure of 1.2 atm. and with a contact time of 2 seconds. The following results were obtained:

|  | Percent |
|---|---|
| Butene conversion | 82.6 |
| Acetic acid selectivtiy | 48.1 |
| Acetaldehyde selectivity | 7.4 |
| Acrylic acid selectivity | 4.3 |
| Maleic acid selectivity | 1.4 |
| $CO_2$+CO selectivity | 36.0 |

EXAMPLE XIII

To an aqueous solution containing 5 g. of ammonium paramolybdate and 43 g. of ammonium metavanadate was admixed an aqueous solution, acidified with HCl, and containing 38.6 g. of $SbCl_3$. After neutralization of this mixture with ammonia, there were added to it 310 g. of a silica sol at 30% and the whole was then brought to dryness and finally calcined at 550° C. for 8 hours in an air stream.

Over the catalyst thus prepared was made to react a gaseous mixture containing by volume 4% of 2-butene, 52% of air and 44% of steam, operating at a temperature of 330° C. under a pressure of 3 atm. and with a contact time of 2 seconds. The results were as follows:

|  | Percent |
|---|---|
| Butene conversion | 96.3 |
| Acetic acid selectivity | 46.4 |
| Acetaldehyde selectivity | 13.6 |
| Acetone selectivity | 2.2 |
| Acrylic acid selectivity | 1.8 |
| Maleic acid selectivity | 2.7 |
| $CO_2$+CO selectivity | 32.0 |

EXAMPLE XIV

To an aqueous solution, acidified with HCl, and containing 14.8 g. of $V_2O_5$, there was admixed an aqueous solution containing 60 g. of ammonium paramolybdate and an aqueous solution, acidified with HCl, containing 166.4 g. of $SbCl_3$. After neutralization of the resulting mixture with ammonia at 10%, the whole was brought to dryness and the mass thus obtained was then treated as described above in Example XII.

By sending over the catalyst thus prepared a gaseous mixture consisting by volume of 4.3% of 2-butene, 52% of air and 43.7% of steam, at a temperature of 370° C. and under a pressure of 1.2 atm. and with a contact time of 2 seconds, there were obtained the following results:

|  | Percent |
|---|---|
| Butene conversion | 85.0 |
| Acetic acid selectivity | 46.1 |
| Acetaldehyde selectivity | 7.9 |
| Acrolein selectivity | 2.2 |
| Methacrolein selectivity | 7.1 |
| Acrylic acid selectivity | 5.2 |
| Maleic acid selectivity | 10.1 |
| $CO_2$+CO selectivity | 19.6 |

EXAMPLE XV

To an aqueous solution containing 43 g. of ammonium paramolybdate and 12.7 g. of ammonium metavanadate was admixed an aqueous solution, acidified with HCl, containing 25 g. of $SbCl_3$. After neutralizing this mixture was ammonia at 10%, there was added to it 312 g. of a silica sol at 30% and the whole was then brought to dryness. The mass thus obtained was activated as described above in Example XII.

Over the catalyst thus prepared was made to react a gaseous mixture consisting by volume of 4.3% of 2-butene, 52% of air and 43.7% of steam. Operating at 370° C., under a pressure of 1.2 atm. and with a contact time of 2 seconds, the following results were obtained:

|  | Percent |
|---|---|
| Butene conversion | 87.3 |
| Acetic acid selectivity | 40.5 |
| Acetaldehyde selectivity | 17.0 |
| Acetone selectivity | 2.4 |
| Methacrolein selectivity | 4.9 |
| Acrylic acid selectivity | 2.8 |
| Maleic acid selectivity | 6.9 |
| $CO_2$+CO selectivity | 24.3 |

EXAMPLE XVI

To an aqueous solution containing 25 g. of ammonium paramolybdate and 16.5 g. of ammonium metavanadate was admixed an aqueous solution, acidified with HCl, containing 27.7 g. of $SbCl_3$. After neutralizing this mixture with ammonia, there were added to it 254 g. of a silica sol at 30% and the whole was brought up to dryness. The residue was then dried at 110° C. and finally calcined for 8 hours at 600° C. in an air stream.

Over the catalyst thus obtained was then passed, under a pressure of 1.2 atm. at 350° C. and with a contact time of 2 seconds, a gaseous mixture containing by volume 4% of 1-butene, 52% of air and 44% of steam, thereby obtaining the following results:

|  | Percent |
|---|---|
| Butene conversion | 90.9 |
| Acetic acid selectivity | 40.7 |
| Acetaldehyde selectivity | 18.1 |
| Acetone selectivity | 3.7 |
| Methacrolein selectivity | 5.4 |
| Acrylic acid selectivity | 2.0 |
| Maleic acid selectivity | 4.1 |
| $CO_2$+CO selectivity | 25.0 |

EXAMPLE XVII

By combining an aqueous solution containing 153 g. of ammonium paramolybdate and 9.9 g. of ammonium metavanadate with an aqueous solution, acidified with HCl, containing 169.8 g. of antimony chloride, there was obtained a solution which after neutralization, was evaporated to dryness. The solid thus obtained, after drying at 110° C., was then activated for 8 hours at 450° C. in a stream of nitrogen.

The catalyst thus prepared was tested under the same reaction conditions as described above in Example XV and the following results were obtained:

| | Percent |
|---|---|
| Butene conversion | 90.3 |
| Acetic acid selectivity | 47.3 |
| Acetaldehyde selectivity | 3.2 |
| Methacrolein selectivity | 3.4 |
| Acrylic acid selectivity | 6.4 |
| Maleic acid selectivity | 7.4 |
| $CO_2$+CO selectivity | 28.9 |

EXAMPLE XVIII

A catalyst identical in composition with that described above in Example XVI, but activated at 500° C. for 8 hours in nitrogen, was tested with a mixture consisting by volume of 5% of isobutene, 55% of air and 40% of steam, operating at a temperature of 350° C. under a pressure of 1.2 atm. and with a contact time of 3 seconds. The following results were obtained:

| | Percent |
|---|---|
| Isobutene conversion | 70.0 |
| Acetic acid selectivity | 27.9 |
| Acetaldehyde selectivity | 5.4 |
| Methacrolein selectivity | 27.0 |
| Acrolein selectivity | 3.2 |
| Methacrylic acid selectivity | 4.0 |
| $CO_2$+CO selectivity | 31.2 |

EXAMPLE XIX

Into 800 cc. of water were dissolved 355 g. of ammonium paramolybdate and 46.8 g. of ammonium metavanadate. To this solution was then admixed 24.2 g. of metallic antimony and the whole was then heated up to complete dissolution.

This solution was then impregnated with 831 g. of microspheroidal silica and the product thus obtained, after drying in an oven at 110° C., was activated for 9.5 hours at 450° C. in a current of nitrogen. The carrier formed 70% by weight of the total catalyst.

Over the finished catalyst was then passed, at a temperature of 430° C. and under a pressure of 1.2 atm. and with a contact time of 1.5 seconds, a gaseous mixture consisting by volume of 55% of air, 40% of steam and 5% of an industrial fraction containing mainly olefines having 4 carbon atoms per molecule.

The composition by volume of said fraction was at follows:

| | Percent |
|---|---|
| Propane | 0.2 |
| Propylene | 1.8 |
| Isobutane | 1.5 |
| n-Butane | 7.1 |
| 1-butene | 26.5 |
| 2-butene | 18.1 |
| Isobutene | 42.9 |
| 1-3 butadiene | 1.9 |

The following results were obtained:

| | Percent |
|---|---|
| Conversion | 84.0 |
| Acetic acid selectivity | 38.6 |
| Methacrolein selectivity | 23.6 |
| Acetone selectivity | 5.5 |
| Acrylic acid selectivity | 3.4 |
| Methacrylic acid selectivity | 3.7 |
| $CO_2$+CO selectivity | 23.6 |

The same feed mixture, under identical reaction conditions, was made to react over the catalyst of Example I above, thereby obtaining the following results:

| | Percent |
|---|---|
| Conversion | 84.4 |
| Acetic acid selectivity | 33.5 |
| Acetaldehyde selectivity | 4.3 |
| Methacrolein selectivity | 13.6 |
| Acetone selectivity | 6.6 |
| Acrylic acid selectivity | 2.7 |
| Methacrylic acid selectivity | 3.0 |
| CO+$CO_2$ selectivity | 34.5 |

In Table 1 below are reported all the main data concerning the above-described examples in which there has been used a Mo/V catalyst.

In Table 2 are reported all the main data concerning the above-described examples in which there has been used a Mo/V/Sb catalyst.

TABLE 1

| Example No. | Catalyst (Mo, V) | | Hydro-carbon | T., °C. | t., sec. | Conver., percent | $CH_3COOH$, percent | $CH_3CHO$, percent | CO+$CO_2$, percent |
|---|---|---|---|---|---|---|---|---|---|
| | Carrier | Activation | | | | | | | |
| 1 | | 450° C., 10 h.[1] | 2-$C_4$ | 370 | 2 | 96.3 | 46.7 | 4.1 | 35.3 |
| 1 bis | | 450° C., 10 h.[1] | 1-$C_4$ | 400 | 2 | 85.4 | 46.2 | 7.6 | 27.4 |
| 2 | | 500° C., 8 h.[1] | 2-$C_4$ | 370 | 2 | 91.0 | 44.0 | 6.5 | 36.5 |
| 3 | 65% $SiO_2$ | 450° C., 8 h.[1] | 2-$C_4$ | 350 | 1.8 | 93.0 | 54.2 | 2.4 | 27.0 |
| 4 | 50% $SiO_2$ | 450° C., 8 h.[1] | 2-$C_4$ | 320 | 1.8 | 100 | 52.4 | <1 | 37.2 |
| 5 | | 450° C., 8 h.[2] | Iso-$C_4$ | 430 | 1.5 | 72.8 | 29.3 | <1 | 38.2 |
| 5 bis | | 450° C., 8 h.[2] | $C_3$ | 330 | 2 | 79.0 | 53.7 | <1 | 36.0 |
| 19 bis | | 450° C., 10 h.[1] | Frac. $C_4$ | 430 | 1.5 | 84.4 | 33.5 | 4.3 | 34.5 |

[1] In air. [2] In nitrogen.

TABLE 2

| Example No. | Catalyst (Mo, V) | | Hydro-carbon | T., °C. | t., sec. | Conver., percent | $CH_3COOH$, percent | $CH_3CHO$, percent | CO+$CO_2$, percent |
|---|---|---|---|---|---|---|---|---|---|
| | Carrier | Activation | | | | | | | |
| 6 | | 450° C., 8 h.[1] | 2-$C_4$ | 400 | 2 | 97.0 | 37.4 | 6.4 | 27.5 |
| 7 | | 450° C., 7 h.[2] | 2-$C_4$ | 400 | 1 | 91.2 | 54.4 | <1 | 22.5 |
| 8 | | 550° C., 8 h.[1] | 2-$C_4$ | 370 | 3 | 91.6 | 44.2 | 12.6 | 23.7 |
| 9 | | 550° C., 8 h.[1] | 2-$C_4$ | 330 | 4 | 90.0 | 54.2 | 11.3 | 26.9 |
| 10 | | 450° C., 8 h.[1] | 2-$C_4$ | 370 | 2 | 89.0 | 36.8 | 7.4 | 24.1 |
| 11 | | 500° C., 8 h.[1] | 2-$C_4$ | 355 | 2 | 98.6 | 50.0 | 3.2 | 30.0 |
| 12 | | 550° C., 8 h.[1] | 2-$C_4$ | 320 | 2 | 82.6 | 48.1 | 7.4 | 36.0 |
| 13 | 60% $SiO_2$ | 550° C., 8 h.[1] | 2-$C_4$ | 330 | 2 | 96.3 | 46.4 | 13.6 | 32.0 |
| 14 | | 550° C., 8 h.[1] | 2-$C_4$ | 370 | 2 | 85.0 | 46.1 | 7.9 | 19.6 |
| 15 | 60% $SiO_2$ | 550° C., 8 h.[1] | 2-$C_4$ | 370 | 2 | 87.3 | 40.5 | 17.0 | 24.3 |
| 16 | 60% $SiO_2$ | 600° C., 8 h.[1] | 1-$C_4$ | 350 | 2 | 90.9 | 40.7 | 18.1 | 25.0 |
| 17 | | 450° C., 8 h.[2] | 2-$C_4$ | 370 | 2 | 90.3 | 47.3 | 3.2 | 28.9 |
| 18 | 60% $SiO_2$ | 500° C., 8 h.[2] | Iso-$C_4$ | 350 | 3 | 70.0 | 27.9 | 5.4 | 31.2 |
| 19 | 70% $SiO_2$ | 450° C., 9.5 h.[2] | Frac. $C_4$ | 430 | 1.5 | 84.0 | 38.6 | <1 | 23.6 |

[1] In air. [2] In nitrogen.

What is claimed is:

1. A vapor phase process for the preparation of acetic acid by the oxidation with oxygen or with an oxygen-containing gas, of one or more low molecular weight unsaturated hydrocarbons containing 3–4 carbon atoms, wherein the reaction is conducted with a quantity of unsaturated hydrocarbon between 1.5% and 10% by volume with respect to the reaction mixture; with a molar ratio oxygen/olefine between 1:1 and 5:1; at a temperature of from 250° C. to 500° C.; with a contact time between 0.1 and 20 seconds; and in the presence of a catalyst consisting essentially of molybdenum, vanadium, oxygen and optionally also antimony, activated by heating at a temperature between 400° and 650° C. and in which the atomic ratios between the elements Mo, V and Sb correspond to the empirical formula: $Mo_a V_b Sb_c$ wherein $a+b+c=100$, $a$ varies from 5 to 95, $b$ varies from 5 to 95 and $c$ varies from 0 to 90.

2. A process according to claim 1, wherein catalyst is used on a carrier.

3. A process according to claim 1, wherein the starting unsaturated hydrocarbon comprises propylene.

4. A process according to claim 1, wherein the starting unsaturated hydrocarbon comprises butene-1.

5. A process according to claim 1, wherein the starting unsaturated hydrocarbon comprises butene-2.

6. A process according to claim 1, wherein the starting unsaturated hydrocarbon comprises isobutene.

7. A process according to claim 1, wherein the starting unsaturated hydrocarbons consists of a fraction of unsaturated hydrcarbons with 4 carbon atoms obtained as a by-product of chemical or petrochemical processing.

8. A process according to claim 1, wherein the starting hydrocarbon material consists of from 2.5% to 6% by volume of the reaction mixture.

9. A process according to claim 1, wherein the temperature is between 300° and 450° C.

10. A process according to claim 1, wherein the contact time is between 0.5 and 10 seconds.

11. A process according to claim 1, wherein said process is conducted under pressures that are equal to or greater than atmospheric pressure.

12. A process according to claim 1, wherein the oxygen-containing gas is air.

13. A process according to claim 1, wherein the molar ratio oxygen/unsaturated hydrocarbon is between 1.5:1 and 3.5:1.

14. A process according to claim 1, wherein the reaction is carried out in the presence of one or more inert diluents.

15. A process according to claim 14, wherein the inert diluent is nitrogen.

16. A process according to claim 14, wherein the inert diluent is carbon dioxide.

17. A process according to claim 14, wherein the inert diluent is aqueous steam.

18. A process according to claim 14, wherein the inert diluent is a saturated hydrocarbon.

References Cited

UNITED STATES PATENTS

| | | | |
|---|---|---|---|
| 3,104,263 | 9/1963 | Riemenschneide | 260—533 R |
| 3,431,297 | 3/1969 | Brockhaus | 260—533 R |
| 3,439,029 | 4/1969 | Brockhaus | 260—533 R |
| 3,459,797 | 8/1969 | Brockhaus et al. | 260—533 R |
| 3,536,755 | 10/1970 | Parthasarathy et al. | 260—533 R |
| 3,600,443 | 8/1971 | Evedalli et al. | 260—533 R |
| 3,636,156 | 1/1972 | Ofaki et al. | 260—533 R |

FOREIGN PATENTS

| | | | |
|---|---|---|---|
| 977,496 | 12/1964 | United Kingdom | 260—533 R |

LORRAINE A. WEINBERGER, Primary Examiner

R. D. KELLY, Assistant Examiner

U.S. Cl. X.R.

260—604 R